US009038898B2

(12) United States Patent
Cooper

(10) Patent No.: US 9,038,898 B2
(45) Date of Patent: May 26, 2015

(54) ANTI-THEFT SECURITY DEVICE TO INCREASE MARKETING OPPORTUNITIES

(71) Applicant: Avery Dennison Corporation, Pasadena, CA (US)

(72) Inventor: William J. Cooper, Natick, MA (US)

(73) Assignee: Avery Dennison Corporation, Glendale, CA (US)

( * ) Notice: Subject to any disclaimer, the term of this patent is extended or adjusted under 35 U.S.C. 154(b) by 167 days.

(21) Appl. No.: 13/630,161

(22) Filed: Sep. 28, 2012

(65) Prior Publication Data

US 2013/0082113 A1 Apr. 4, 2013

Related U.S. Application Data

(60) Provisional application No. 61/541,018, filed on Sep. 29, 2011.

(51) Int. Cl.
*G06K 15/00* (2006.01)
*E05B 73/00* (2006.01)

(52) U.S. Cl.
CPC .................................. *E05B 73/0017* (2013.01)

(58) Field of Classification Search
CPC ..... G06K 19/077; G09F 3/04; E05B 73/0017; G08B 13/2434
USPC .................................. 235/492, 383, 385, 439
See application file for complete search history.

(56) References Cited

U.S. PATENT DOCUMENTS

| | | | | |
|---|---|---|---|---|
| 7,714,721 | B1 * | 5/2010 | Feibelman et al. | 340/568.1 |
| 7,895,774 | B2 * | 3/2011 | Pawsey | 36/136 |
| 7,973,661 | B2 * | 7/2011 | Copeland | 340/572.1 |
| 2004/0016269 | A1 | 1/2004 | Skjellerup | |
| 2009/0058659 | A1 | 3/2009 | Handyside et al. | |
| 2010/0231388 | A1 * | 9/2010 | Shute et al. | 340/568.4 |

OTHER PUBLICATIONS

International Search Report and Written Opinion dated Apr. 2, 2013 for International Application No. PCT/US2012/057801.
Chemco: "EAS Tags & Labels", XP002690772, Retrieved from the Internet: http://www.chemco.com.sg/electronics/products/eas/eas-tags-labels/ [retrieved on Jan. 23, 2013]the whole docuement.
Nedap: "Labels & Tags", May 10, 2010, XP002690771, Retrieved from the Internet: http://www.nedap-retail.com/super/labels-tags-and-accesoires [retrieved on Jan. 22, 2013]last paragraph.

* cited by examiner

*Primary Examiner* — Seung Lee
(74) *Attorney, Agent, or Firm* — Avery Dennison Retail Information Services LLC

(57) ABSTRACT

The present invention relates to a security device for improving the marketing impact of an article of commerce. The device generally includes a housing having a base and a cover with the cover having at least one opening to allow for the insertion of an attachment mechanism. The housing element of the present invention in one embodiment is in a shape representing a particular theme such as a particular trademark, trade dress, special events, commemorative events, historical events and combinations thereof. The housing may contain an RFID device and/or an electronic article security device. The present invention also provides a method of attaching a security device described herein to an article of commerce.

22 Claims, 5 Drawing Sheets

ANTI-THEFT SECURITY DEVICE TO INCREASE MARKETING OPPORTUNITIES

CROSS-REFERENCE TO RELATED APPLICATION

The present application claims the benefit of U.S. Provisional Patent Application No. 61/541,018 filed Sep. 29, 2011, which is incorporated herein by reference in its entirety.

FIELD OF THE INVENTION

The present invention relates to security devices. More specifically, the present invention relates to security devices that operate using a functional conventional locking mechanism while simultaneously providing a visual component that is related to the particular trade dress, theme or combinations thereof of the retailer or manufacturer.

BACKGROUND OF THE INVENTION

A common problem at retail stores is shoplifting or theft, and a plurality of security devices are currently utilized by retailers to protect merchandise and combat the growing misappropriation of consumer goods. A common objective of retailers is to utilize security devices that can be produced efficiently at a relatively low cost and are capable of visually deterring shoplifters and which include security devices that will activate an alarm or trigger some sort of alert to the retailer or security personnel that an authorized activity is taking place. This objective can be accomplished by utilizing conventional fastener mechanisms such as ball and clutch type mechanisms that locks a security device onto a garment or other apparel item. However, conventional fastener mechanisms no longer provide much of a visual deterrence to experienced shoplifters that have already defeated these devices in the past. In addition, such security tags, that do provide the most visual deterrence to shoplifters such as hard tag security mechanisms, are often bulky and larger in size which conflicts with a retailer's desire to use a smaller device so as to not interfere and distract the consumer. Furthermore, generic, bulky, larger security device makes it more difficult to try on certain garments. In addition, security devices are routinely put on the articles in retail stores by clerks with varying levels of training and whose primary duty is serving customers, leading to inconsistent attachment of security devices, faulty alarms and thus unprotected items.

Presently, there exists a need in the marketplace for a cost efficient security device that provides a visual component that can serve a marketing purpose for a retailer, manufacturer, sponsor as well as a visual deterrence to shoplifters while simultaneously providing a conventional security purpose.

Additionally, retailers may desire to provide a security device that also serves as a marketing opportunity for their company and one that is aesthetically pleasing to a consumer. For instance a company may want to provide a conventional fastener mechanism that is constructed as part of a trademark, theme or trade dress of the company that may be reused by a consumer independently from the purchased item, such as a collector pin or other nostalgic piece.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In today's retailing market, the ability to provide and create additional advertising space or devices by which to increase customer attention and improve the marketing impact of a particular campaign is a highly sought after solution. Finding new "real estate" in retail environments can help grow brand awareness. The present invention creates an additional marketing tool to be used by retailers, manufacturers, event promoters or the like in order further attract interest in a particular line of consumer goods. By creating additional marketing space while providing the necessary security required by today's retailers, marketing campaigns can further be expanded.

In accordance with one embodiment of the present invention, the present invention provides a security device having a fastener mechanism coupled with and contained in a removable housing. The housing is a "dummy" or shell that does not serve a security purpose, other than to contain the fastening device but may serve as a visual deterrent or an aesthetic purpose.

In accordance with another embodiment of the present invention, a method is provided for attaching a security device of the present invention to a consumer article, such as a garment or other item of value and enclosing the security device within a supplemental or removable housing.

In accordance with another embodiment of the present invention, a RFID device may be inserted into a decorative or ornamental housing of the security device of the present invention.

In a yet further exemplary embodiment of the presently described invention, a method is described for creating a security device in cooperation with a particular marketing theme. The method includes, initially selecting a theme, developing a marketing campaign for the particular theme and then forming a rigid shape in a form recognizing or embellishing the theme. The housing, which is preferably removable, is then positioned on or around a locking or fastening mechanism to form a themed locking device. Next, the themed locking device is attached to an article of commerce and securely fastened to the article of commerce to provide for security of the article. The housing is then removed from the security device at a point of sale and the housing is sold to a customer.

In a still further exemplary embodiment of the presently described invention a marketing device is described and includes a housing configured to be in a shape of a particular marketing theme. A fastening mechanism is contained within the housing. An attaching mechanism is configured to cooperate with the fastening mechanism to form a themed security device and the themed security device is removably connected to an article of commerce.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

As used herein, the terms “theme”, “campaign”, “trade dress” or “trademark” are used as a visual presentation to advertise, brand, inform, illustrate or entertain. Such devices can also have tactile elements to further illustrate a concept.

Figure 1:
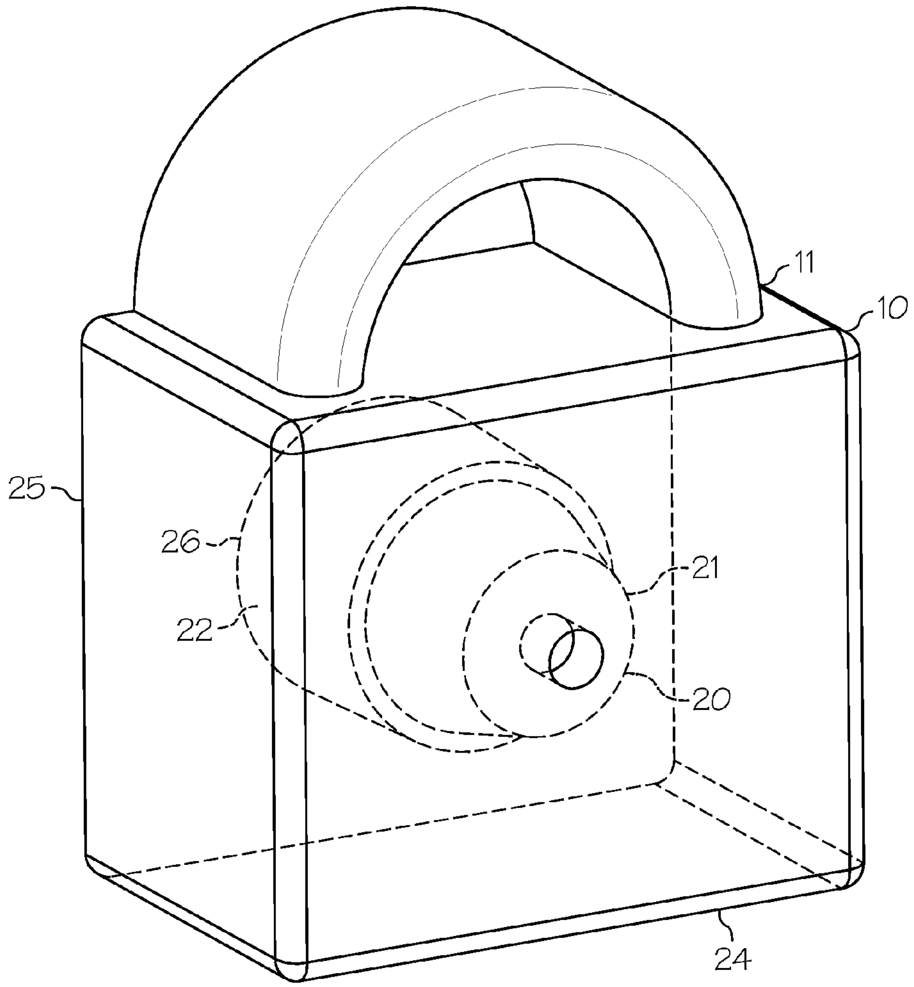
FIG. 1 depicts a three dimensional view of a security device of the present invention having a ball and clutch fastener mechanism and a housing resembling a padlock.

In reference to the figures, and initially to FIG. 1, a security device 11 having a housing 10, the security device 11 is provided. The housing 10, which is preferably devised to illustrate a theme or campaign, has a base 24 and a cover 25. The cover 25 of the housing 10 has at least one opening 26 wherein an attaching mechanism 20 is inserted through the at least one opening 26 in the housing 10. The present invention also contemplates that an opening 30 may be in the base 24 of the housing 10 as well. Furthermore, a plurality of openings may be made in the housing 10 of the present security device 11. The housing 10 may be constructed from any suitable material, but generally thermoplastic materials are preferred.

In one embodiment, the housing 10 serves as a “dummy” or shell for a security device and does not itself serve a security purpose such as with conventional hard tags which include an electronic article surveillance feature (“EAS”) and may be molded into a wide variety of geometric shapes that may accompany a security device. The shape will preferably be distinct from conventional EAS hard tags, such as those offered under the SENSORMATICR® name and are generally rectangular in shape.

In one embodiment, the housing 10 serves as a visual deterrent to shoplifters by providing a theme or shape that is not generally known to shoplifters and may cause additional hesitation on the part of the thief. For example, the housing may be molded to resemble a padlock even though the security device 11 is not in fact a padlock but only constructed to look like one, and does not functionally operate as a pad lock. Generally, it is well known in the art that a padlock generally comprises a body, and a hingeable shackle portion that serves to lock and unlock the padlock. A gap is created between the shackle and the body of the padlock. In one embodiment, the housing 10 of the present invention would be constructed to resemble the body and hingeable shackle portion of a padlock.

Figure 2:
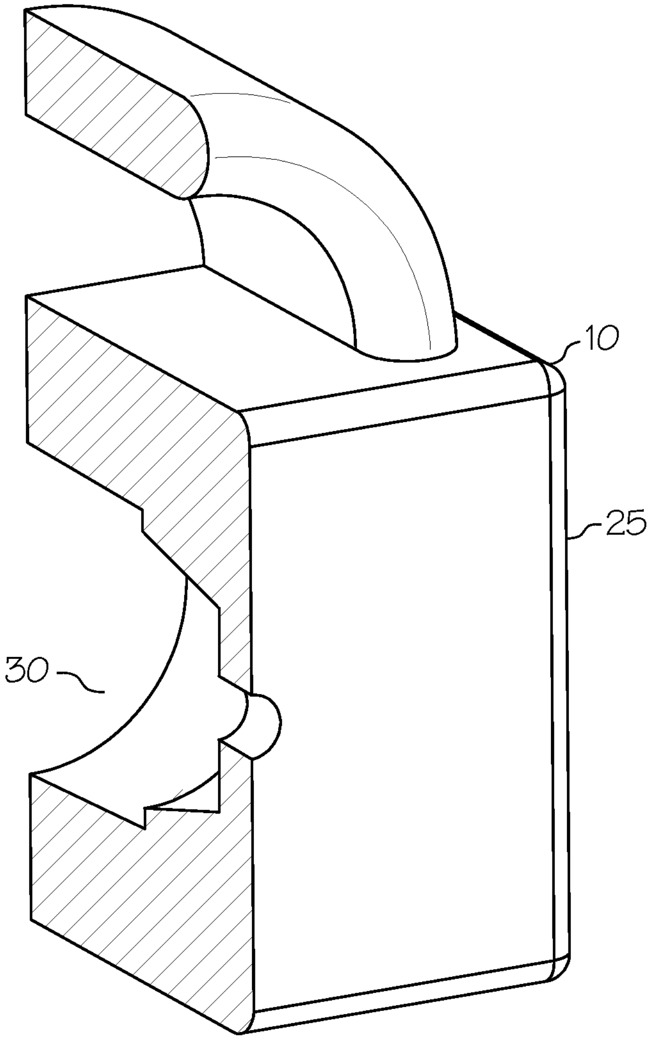
FIG. 2 is a cross sectional view of a housing resembling a padlock having an opening for a fastener mechanism.

Generally, a housing which is illustrated as a padlock in FIG. 2, has a body, and a hingeable shackle portion that serves to or simulates locking and unlocking a padlock. In the present embodiment, the shackle portion may be fixed or movable. A gap may be created between the shackle and the body of the padlock so as to more closely resemble a real padlock. In this FIG. 2, the housing may enhance the security aspects of the device due to the appearance of the lock.

Figure 3:
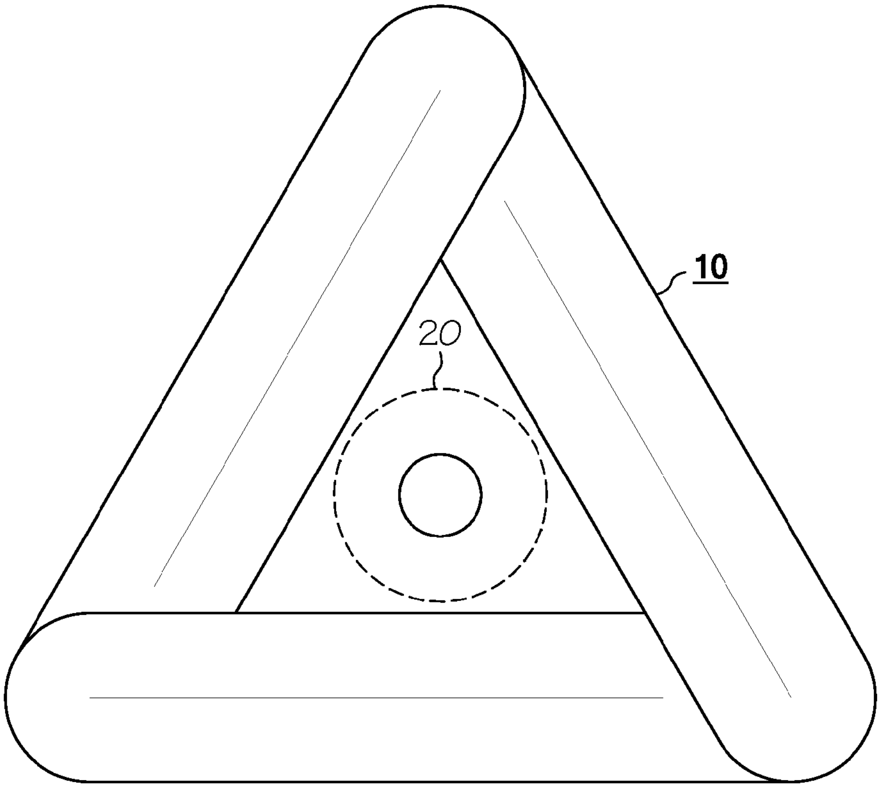
FIG. 3 illustrates a housing resembling a trademark of a company having a fastener mechanism.

In another embodiment of the present invention as shown in FIG. 3, the housing 10 may serve a marketing purpose and may be aesthetically pleasing to a consumer. For example, the housing 10 may be molded into a trademark of a company. In one embodiment, once the fastener mechanism 20 is removed from the housing 10, if aesthetically pleasing to the consumer the housing 10 may be used independently from the fastener mechanism 20 and the item purchased to which the security device 11 is attached. This is advantageous, because it supports the recyclability of the hard tag of the present invention and provides another piece that the consumer may retain as part of the retailing experience. This allows the retailer or merchandiser to regularly change the housing to increase consumer brand awareness and potentially further thwart shoplifters by encountering different housing elements. The housing 10 may be selected from any sort of theme, promotion, marketing campaign or the like. For example, the housing 10 in addition to being representative of a trademark, may also replicate a portion of a particular trade dress, special event, commemorative, historical event or the like. In one example, the housing 10 may be molded into a shape resembling a trademark of a company, for example a well known word mark, phrase or symbol.

In the presently described embodiment, once the fastener mechanism 20 is removed from the housing 10, such as at the time of purchase of an item, the customer may be asked if he or she is interested in acquiring the housing and or if the housing is aesthetically pleasing to the customer. If so, the housing 10 may be retained separately by the consumer from the fastener mechanism 20 and the time purchased to which the security device 11 had been originally attached. This sale can occur at a point of sale in a retail environment such as at a cashier location or other suitable location. The housing can then be sold to the customer. This is advantageous, as it supports the recyclability or reusability of the security device of the present invention as it can be inserted into another housing. In addition, it presents the retailer with an additional sale opportunity as an additional fee may be charged or collected from the consumer to retain the commemorative housing 10.

The housing 10 may be constructed out of plastic. More specifically the housing 10 may be constructed out of a thermoplastic or thermosetting polymer. Furthermore, the housing 10 may be molded out polyethylene, polystyrene, polyvinyl chloride, or polytetrafluorethylene. Additionally, it is contemplated by the present invention that the housing may be constructed out of metal, cellulosic material, recycled material, cloth or any other material that may readily lend itself to the particular theme being promoted at the time the housing is being constructed.

In the embodiment of FIG. 1, the fastener mechanism 20 has a pin and a clutch. The pin having a first end and a second end. The second end of the pin is covered once attached to an article and the first end of the pin is covered once the pin is inserted through the opening 30 in the cover of the security device 11. It is contemplated by the present invention that the fastener mechanism 20 may not in fact comprise a conventional pin and clutch but instead may comprise any type of fastener mechanism 20 suitable for the present invention such as a latch/pin mechanism or magnetic clutch type device.

In another embodiment of the present invention, the housing 10 may house a radio frequency identification device (RFID) having an integrated chip and antenna. The RFID device may be provided as a label or tag or as an inlay which can simply be inserted into the housing. Suitable RFID devices are available from Avery Dennison RFID Company of Clinton, S.C.

The housing may or may not in this particular embodiment have an opening to allow for a fastener mechanism 20. Once a consumer purchases an item to which the housing is attached, the RFID may be deactivated by the retailer or the consumer, depending on the deactivation feature(s) present with the RFID device, so that the consumer can retain the housing 10 independent of the RFID device if the housing 10 is aesthetically pleasing to the consumer.

FIG. 2 depicts a cross sectional view of the cover 25 of the housing 10 having an opening 30 through which a suitable fastener mechanism may be inserted. The fastener mechanism can be attached to the housing by an adhesive, mechanical mans such as a clip, interlocking members, friction and other forces.

FIG. 3 depicts an alternative housing 10 of the security device 11 of the present invention wherein the housing 10 resembles a trademark of a company that can be utilized for marketing purposes. The fastener mechanism may be inserted through an opening 30 in the cover 25 of the housing 20.

In one embodiment, the security device 11 is directly attached to a consumer item, such as an apparel item, consumer electronic or the like, but it may also be attached via a lanyard or may be attached to a piece of material displaying information about an item such as an item's price which is in turn attached to an item such as through a string or wire, commonly known as a hang tag. If the housing of the security device of the present invention is constructed to resemble a padlock, in one embodiment, a lanyard may be inserted through the gap between the body and the shackle of the housing of the security device 11.

Figure 4:
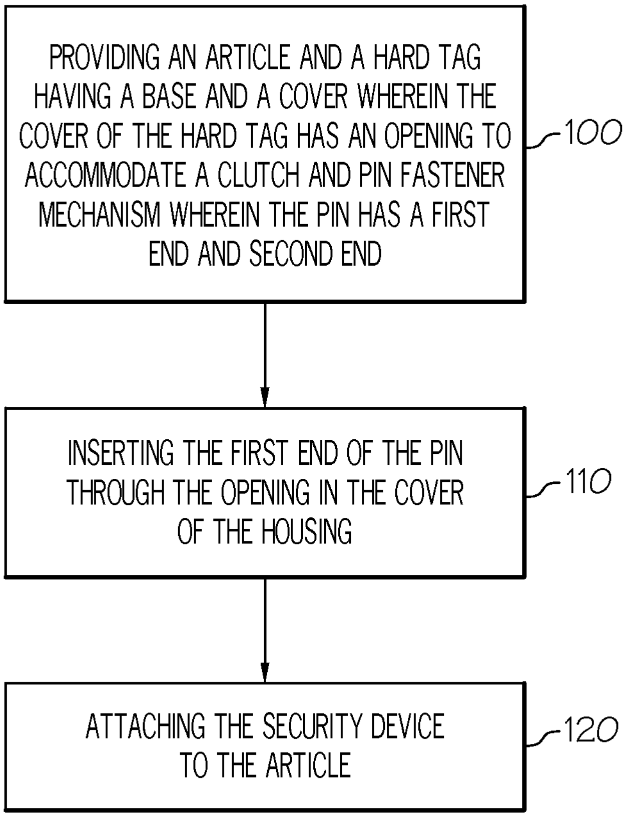
FIG. 4 shows a flow chart setting forth an exemplary method of attaching a security device of the present invention to a consumer item.

FIG. 4 illustrates a method of attaching the security device of the present invention to a consumer item. First in step 100, a hard tag 10 is provided having a base 24 and a cover 25 wherein the housing 10 has an opening 30 fit to accommodate a conventional clutch and pin fastener mechanism 20 or other locking or security type device. In this embodiment, the pin has a first and second end and the housing 10 does not serve a security purpose other than possibly as a visual deterrent. A consumer item is also provided.

Next, in step 110, the first end of the pin is inserted through the opening in the cover of the housing and a cover is placed over the first end of the pin. Third in step 120, the security device is attached to a consumer item and the second end of the pin is covered.

In another embodiment of the present invention, a fastener mechanism includes a RFID device which is inserted through the opening 30 in the cover of the housing 10 of the security device 11. The fastener mechanism and/or the housing of the present invention may also include an electronic article security device (EAS) such as an AM or EM device. Alternatively, the EAS device could be enabled by radio frequency.

In one embodiment of the present invention, the housing 10 resembles a pad lock having a tag on the shackle portion of the housing wherein the shackle is placed through an opening in the tag. The tag may include a RFID device, a dummy tag, or a tag merely illustrating product information. In this presently described embodiment the housing would serve as a convincing deterrent to shoplifters because it would seemingly give the appearance of the capability of functioning as a padlock but in reality would still be utilizing a conventional fastener mechanism that is concealed by the removable housing.

In FIG. 2, the housing 10 resembles a padlock wherein the base is removable from the cover of the housing. This is advantageous, because it allows the easy placement of an RFID device within the housing. It is also contemplated that the base and the cover of the housing could be permanently adhered to one another once the placement of an RFID device is complete. Additionally, it is also contemplated that the cover and base are not permanently adhered but only temporarily adhered via a temporary adhesive. A suitable adhesive would be form of a pressure sensitive adhesive.

In FIG. 3, the housing does not resemble a padlock but resembles a shape representing a particular theme, wherein the housing is divisible into two separate portions. These separable portions of the housing may or may not be easily visible to a consumer. These two portions may separate to allow for placement of a RFID device.

In still a further embodiment of the present invention, a retailer or manufacturer may desire to have successive marketing campaigns in which the housing that is attached to the security device is changed. For example, a first housing can be selected which has a first theme and this is attached to a security device and then subsequently to the article of commerce. Then upon purchase of the item, the first themed housing is removed and handed to the customer, the security device is then attached to a second housing which can have a second theme distinct from the first theme and then the second housing along with the security device is then attached to another consumer good. In this way, the housing elements are interchangeable and can be used as a promotional item while allowing the security device and attaching mechanism to be reused for subsequent goods and articles.

Figure 5:
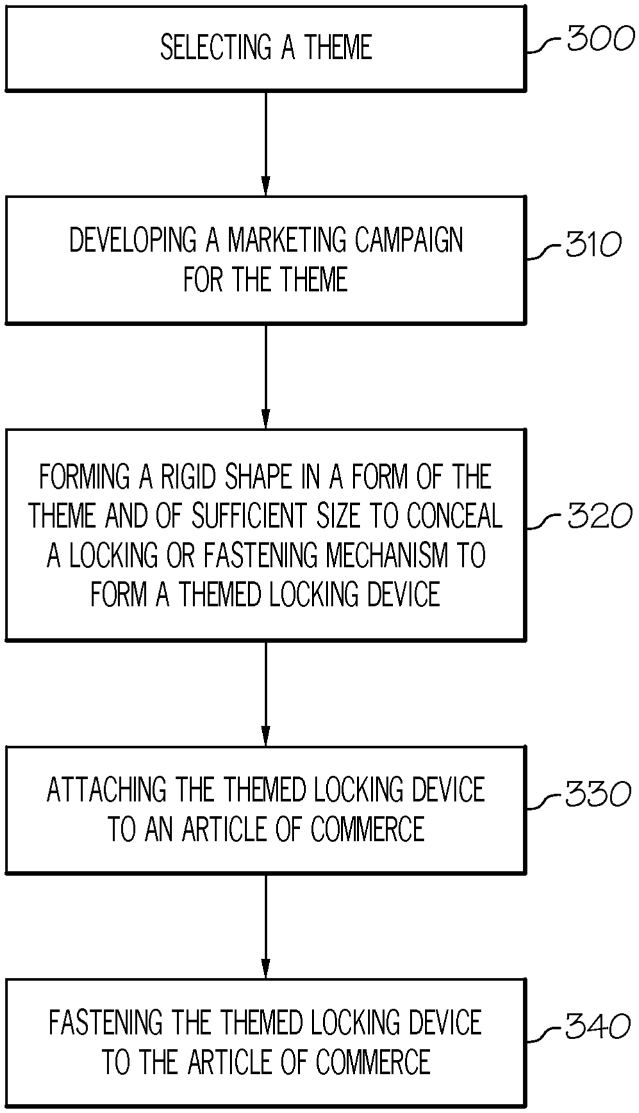
FIG. 5 provides a flow diagram of an exemplary method of making a themed locking mechanism.

FIG. 5 illustrates a method for making a themed locking mechanism. First in step 300 a theme is selected. Next in step 310, a marketing campaign for the theme is developed. Third, in step 320 a rigid shape is formed in a form of the theme and of sufficient size to conceal a locking or fastening mechanism to form a themed locking device. Fourth, in step 330, a themed locking device is attached to an article of commerce. Lastly, in step 340, the themed locking device is fastened to the article of commerce.

It will thus be seen according to the present invention a highly advantageous security device has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A security device comprising:

a consumer product;

a removable housing element having a base, a cover, and at least one opening;

at least one attaching mechanism that serves a security purpose to connect the housing to the consumer product;

the at least one attaching mechanism is sized to fit through the opening in the housing, the at least one attaching mechanism is completely concealed by the housing and the housing and the at least one attaching mechanism are separable from one another; and wherein the housing is configured to be in a shape representing one of a trademark, trade dress, theme, promotion or commemorative event.

2. The security device of claim 1, wherein the housing provides a visual deterrent.

3. The security device of claim 1, wherein the attaching mechanism is a ball and clutch mechanism.

4. The security device of claim 1, wherein the attaching mechanism is a latch and clutch.

5. The security device of claim 1, wherein the at least one attaching mechanism may be reused.

6. The security device of claim 1, wherein the housing further includes a RFID device.

7. The security device of claim 1, wherein the at least one fastener mechanism includes a RFID device.

8. The security device of claim 1, wherein the housing resembles a padlock.

9. The security device of claim 1, wherein the housing includes an EAS device.

10. The security device of claim 9, wherein the EAS device is acoustomagnetic device.

11. The security device of claim 9, wherein the EAS device is an electromagnetic device.

12. The security device of claim 9, wherein the EAS device is enabled by radio frequency.

13. A method of using a security device to an article comprising the steps of:

providing an article and a removable housing having a base and a cover, the cover of the housing has an opening to accommodate a clutch and pin fastener mechanism and the pin has a first end and a second end wherein the housing is configured to be in a shape representing one of a trademark, trade dress, theme promotion or commemorative event;

inserting the first end of the pin through the opening in the cover;

attaching the security device to the article;

removing the housing from the security device at a point of sale; and selling the housing to a customer.

14. A method for creating a security device in cooperation with a particular marketing theme, comprising the steps of:

selecting a theme;

developing a marketing campaign for the theme;

forming a rigid shape in a form of the theme to conceal a locking or fastening mechanism to form a themed locking device such that the locking or fastening mechanism is completely concealed by the rigid shape in the form of the theme and the locking or fastening mechanism is separable from the rigid shape;

attaching the themed locking device to an article of commerce; and fastening the themed locking device to the article of commerce.

15. A method as recited in claim 14, wherein the theme is selected from a group including trademarks, trade dress, special events, commemorative events, historical events and combinations thereof.

16. A method as recited in claim 14, including a further step of removing the housing from the locking or fastening device at a point of sale, after the step of fastening.

17. A method as recited in claim 16, including a further step of providing the housing to a customer after the step of removing.

18. A method as recited in claim 17 wherein the step of providing includes selling.

19. A marketing device, comprising:

a housing having at least one opening configured to be in a shape of a particular marketing theme;

a fastening mechanism contained within the housing;

an attaching mechanism configured to cooperate with the fastening mechanism to form a themed security device such that the attaching mechanism is sized to fit through the at least one opening in the housing; and the themed security device removably connected to an article of commerce.

20. A method of providing a security device in connection with a marketing campaign, comprising the steps of:

selecting a first housing having a first theme;

attaching a security device to the first housing to create a first security device wherein the security device is completely concealed by the housing;

connecting the first security device to an apparel item;

removing the first security device and separating the first housing from the security device to create a first retention item;

selecting a second housing having a second theme;

attaching a security device to the second housing to create a second security device;

connecting the second security device to a consumer good.

21. A method of providing a security device as recited in claim 20, wherein the first theme is distinct from the second theme.

22. A method of providing a security device as recited in claim 20, wherein the first housing is distinct from the second housing.

* * * * *